Sept. 3, 1940. F. PETTIT 2,213,286
COMBINED TRUCK AND COUPLER UNIT
Filed Oct. 21, 1938
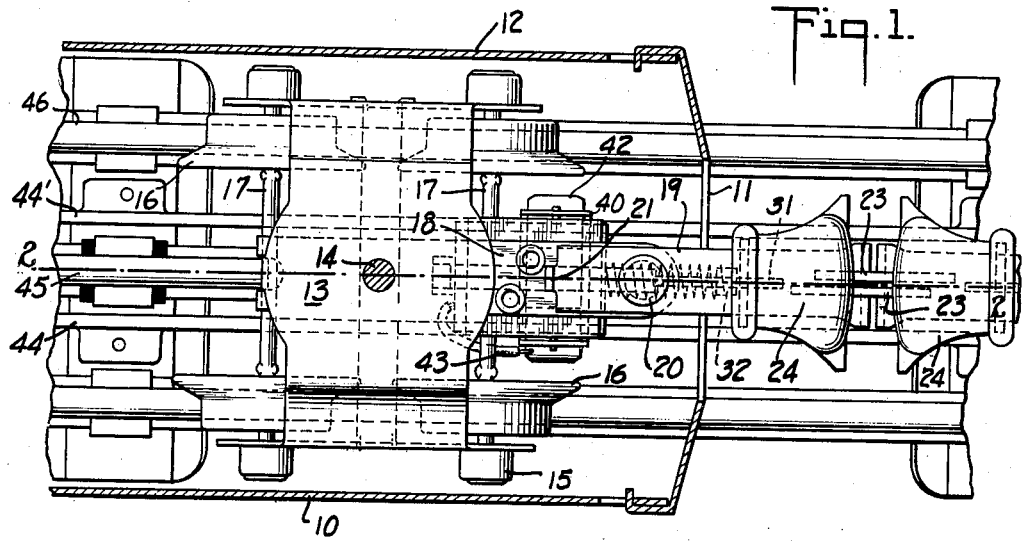
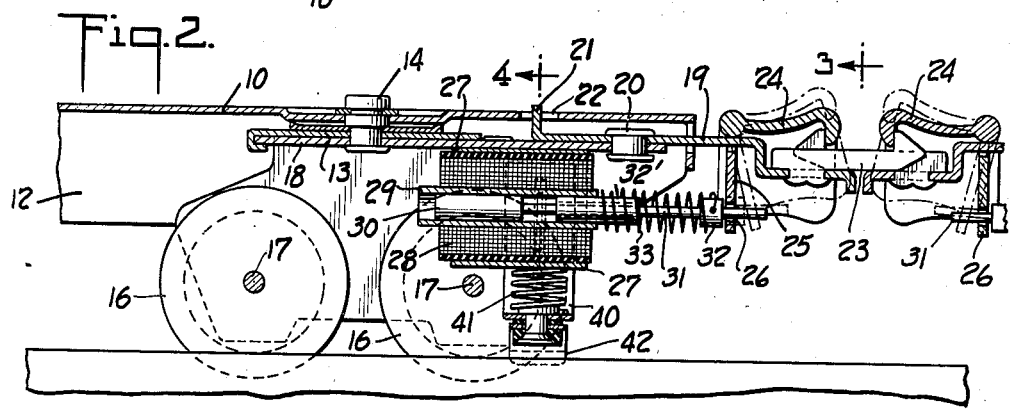
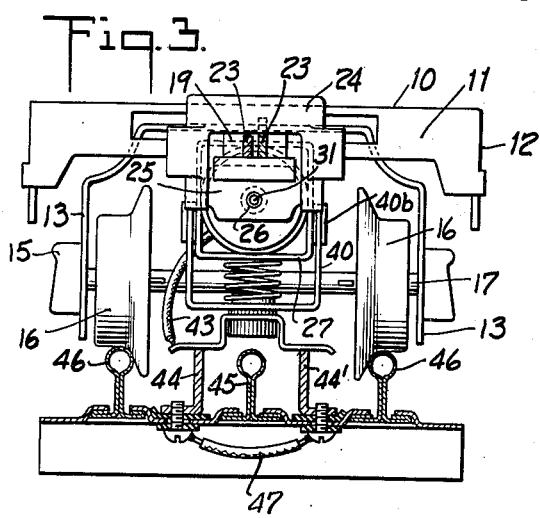
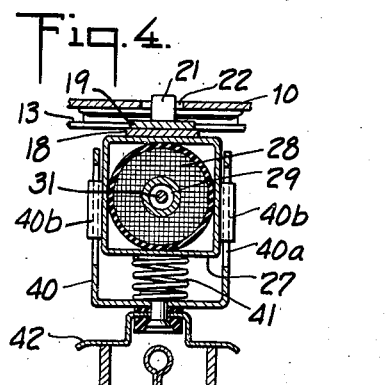
INVENTOR
FRANK PETTIT
BY
Jacob Silberman
ATTORNEY Patented Sept. 3, 1940

REISSUED
NOV 25 1941

2,213,286

UNITED STATES PATENT OFFICE 2,213,286

COMBINED TRUCK AND COUPLER UNIT

Frank Pettit, Irvington, N. J., assignor to The Lionel Corporation, New York, N. Y., a corporation of New York Application October 21, 1938, Serial No. 236,232

5 Claims. (Cl. 213—212)

The present invention relates to combined truck and coupler units for toy electric railroad cars having automatically operable uncoupling devices so that the cars can be uncoupled, when desired, by remote control.

According to the present invention the locomotive and each of the trucks of the cars of a train will be provided with an electromagnetically operated uncoupling device carried by the truck (or locomotive) and associated with the coupler in such a way that when the electromagnetic devices of two adjacent couplers are energized simultaneously, both couplers can be released so that the cars can be separated.

According to the present invention each truck is provided with a bar extending generally longitudinally of the car and centrally disposed with respect to the wheels. This bar is coupled to the truck so as to swing with the truck and it carries a coupler hook and coupler head for cooperation with hooks and heads of other couplers, and electromagnetic means is provided whereby the coupler heads may be shifted to releasing position.

The accompanying drawing shows, for purposes of illustrating the present invention one of the many embodiments in which the invention may take form, it being understood that the drawing is illustrative of the invention rather than limiting the same.

In the drawing:

Figure 1 is a top plan view of the truck of the toy car with associated coupler mechanism, parts of the car body being shown in section;

Figure 2 is a longitudinal sectional view taken on the line 2—2 of Figure 1; and Figures 3 and 4 are transverse sectional views on the lines 3—3 and 4—4, respectively, of Figure 2.

In the drawing a fragment of the bottom of the car is indicated at 10, the end walls at 11 and the side flanges at 12.

A truck frame is shown at 13. The truck frame is of the usual construction and is secured to the car body by the stud 14. It carries the usual journals 15, wheels 16 and axles 17. It also carries a longitudinally extending bar 18 adapted to swing with the truck, and this bar is secured to a coupler bar 19 by a pivot indicated at 20. The rear end of the coupler bar is bent up, as shown at 21 in the drawing, and extends through a slot 22 in the bottom of the car as usual. The front end of the coupler bar carries a coupler hook 23 and a coupler head 24. The heads and hooks of the coupler may be of usual construction. The locking plate 25 usually provided for securing the coupler head on the bar is apertured as indicatetd at 26.

A casing 27 is secured to the underside of the bar 18 and this casing receives a solenoid coil 28 which is wound about a tube 29 and grounded. This tube carries a plunger 30 acting on a pin 31 which extends through the hole 26 and has an abutment 32 adjacent the plate 25. The pin 31 passes through a guide tube 32' and is surrounded by a coiled spring 33 which normally pulls the pin and plunger to the left, as shown in the drawing, so that the coupler head 24 drops by gravity to the full line position. When the coil is energized in a manner to be described the parts will be shifted to the dot-and-dash line position thereby releasing the coupler head from the hook of the other car.

A yoke 40 is slotted, as indicated at 40a to receive projections 40b carried by the casing 27, so that the yoke can slide up and down relative to the casing. A coiled spring 41 is interposed between the yoke and casing to push the yoke down. The yoke insulatedly supports an inverted U-shaped strap or contact member 42 and this contact member is connected to the coil 28 by a wire indicated at 43.

The contact 42 is shaped to span the third rail and to bear upon two supplemental insulated rails 44 and 44' placed between the third rail 41 and the track rails 46. The rails 44 and 44' are of suitable length to support the adjacent trucks of two cars and connected by a wire 47 and when either of them is connected to the power rail through a suitable outside switch, the coil of the electromagnet will be energized, the current flowing through the lead 43, the coil 28 and ground connection to the truck and return rail.

It is obvious that the invention may be embodied in many forms and constructions within the scope of the claims and I wish it to be understood that the particular form shown is but one of the many forms. Various modifications and changes being possible, I do not otherwise limit myself in any way with respect thereto.

What is claimed is:

1. A preassembled combined truck and coupler unit adapted to be pivotally secured to the body of a toy electric railroad car, comprising a truck frame having a pivot post, wheels and axles, a frame-carried solenoid coil, a frame-carried, insulated contact shoe, a coupler bar secured to the truck frame to be swung thereby and having a coupler hook and a gravity-controlled, pivoted coupler head adapted to be raised by the coupler hook of another coupler, and means operable by the coil when energized for raising the coupler head.

2. A combined truck and coupler unit for toy electric railroad cars as claimed in claim 1, wherein the coil is on a horizontal axis and is disposed above an axle.

3. A combined truck and coupler unit for toy electric railroad cars, as claimed in claim 1, wherein the contact shoe is disposed to one side of the line extending midway of the wheels so as to cooperate with a rail disposed between the usual power rail and the usual track rail.

4. A preassembled combined truck and coupler unit adapted to be pivotally secured to the body of a toy electric railroad car, comprising a truck frame having a pivot post, wheels and axles, a frame-carried solenoid coil, a frame-carried, insulated contact shoe, a coupler bar secured to the truck frame to be swung thereby and having a coupler hook and a gravity-controlled, pivoted coupler head adapted to be raised by the coupler hook of another coupler, and a plunger carried in the coil and connected to the coupler head to raise the head.

5. A preassembled combined truck and coupler unit adapted to be pivotally secured to the body of a toy electric railroad car, comprising a truck frame having a pivot post, wheels and axles, a frame-carried solenoid coil, a frame-carried, insulated contact shoe, a coupler bar secured to the truck frame to be swung thereby and having a coupler hook and a gravity-controlled, pivoted coupler head adapted to be raised by the coupler hook of another coupler, a plunger carried in the coil and connected to the coupler head to raise the head, and a plunger return spring.

FRANK PETTIT.